Nov. 22, 1949     F. W. THOMPSON     2,489,061
BURNING TORCH COMPASS
Filed March 19, 1947

Inventor
Franklin W. Thompson

Patented Nov. 22, 1949

2,489,061

UNITED STATES PATENT OFFICE 2,489,061

BURNING TORCH COMPASS

Franklin W. Thompson, Wheatland, Wyo.

Application March 19, 1947, Serial No. 735,767

1 Claim. (Cl. 266—23)

The present invention relates to new and useful improvements in a burning torch compass designed for cutting circles in the work and constructed as an accessory for a conventional burning torch.

An important object of the present invention is to provide a compass bar in which a feed screw is housed for adjusting a compass post relative to the torch carried at the head of the bar and in which the feed screw and compass post may be removed as a unit for replacing, when desired.

A further object of the invention is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
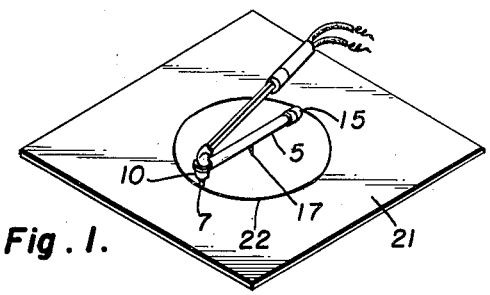
Figure 1 is a perspective view showing the invention in use.

Referring now to the drawing in detail, wherein for the purpose of illustration I have disclosed a preferred embodiment of the invention, the numeral 5 designates a tubular compass post having a longitudinally extending slot 6 in its underside and extending through the rear end of the bar. A compass head 7 is welded or otherwise secured to the front end of the bar 5, the head 7 comprising a longitudinally split sleeve secured in a vertical position to the bar and having its split edges formed with spaced parallel apertured tongues 8 through which a clamping screw 9 is threaded for securing the split edges of the sleeve in clamping engagement on a conventional form of cutting torch 10 supported in a vertical position in the head 7.

A feed screw 11 extends longitudinally in the bar 5, the front and rear ends of the screw having bearing washers 12 and 13 silver brazed or otherwise suitably secured to the screw and rotatably mounted in the bar 5. The screw 11 and washers 12 and 13 are secured in position in the bar by a nut 14 threaded on the rear end of the bar.

The rear end of the screw is provided with a knurled head 15 for rotating the screw.

A traveler 16 in the form of an internally threaded nut or sleeve is threaded on the screw 11 and to one side of which is suitably secured or integrally formed a compass post 17 having a pointed outer end 18, the post projecting through the slot 6 for traveling therein. One edge of the slot 6 is formed with graduations 19 and a mark 20 is formed on the underside of the traveler 16 to provide a setting for the compass post.

Figure 2:
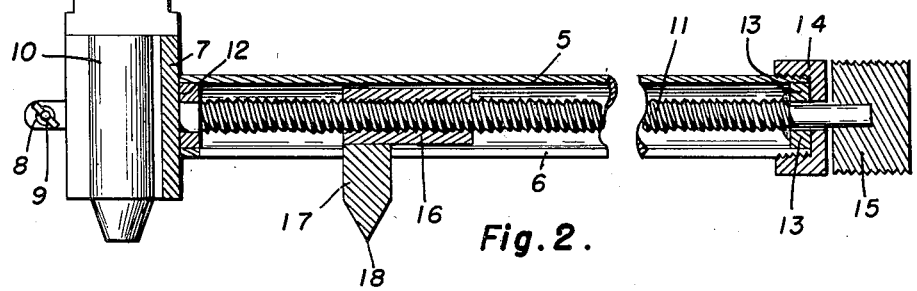
Figure 2 is an enlarged longitudinal sectional view.
Figure 3:
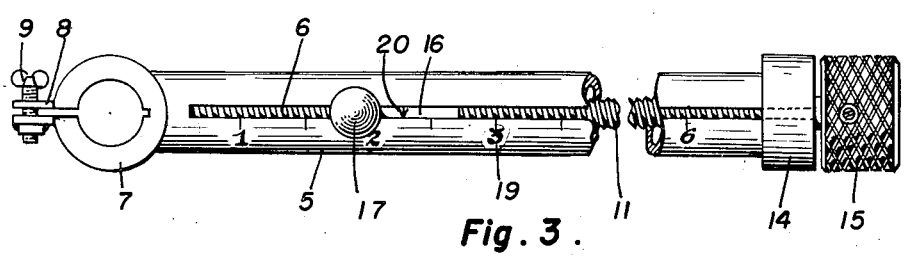
Figure 3 is a bottom plan view.
Figure 4:
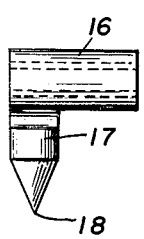
Figure 4 is a side elevational view of the compass post and nut for traveling on the screw; and, Figure 5 is an end elevational view thereof.
Figure 5:
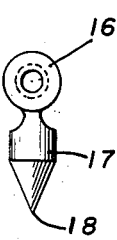

In the operation of the device, with the torch 10 clamped in position in the head 7 as shown in Figures 1 and 2 of the drawings and with the compass post 17 adjusted in the bar 5 to a predetermined radius by the manipulation of the screw 11 the point 18 of the compass post may then be placed on the work 21 and the torch swung in a circle to thus cut a circle in the work as shown at 22.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

What is claimed as new is:

A torch compass comprising a tubular compass bar, a longitudinally split clamping sleeve carried in a vertical position at the front end of the bar and adapted to house a burning torch therein, said compass bar being formed with a slot extending longitudinally from the clamping sleeve to the opposing end of the bar, complementary perforated ears projecting from the sections of the clamping sleeve, fastening means disposed in said ears, a feed screw longitudinally positioned in the bar, front and rear bearings supporting said screw, a guide sleeve threaded on the screw, and a compass post integrally formed with said guide sleeve and depending therefrom, said post being slidably disposed in said slot in the compass bar, said screw, bearings, guide sleeve and post being removable from the bar as a unit.

FRANKLIN W. THOMPSON.

REFERENCES CITED

The following references are of record in the file of this patent:

UNITED STATES PATENTS

| Number | Name | Date |
|---|---|---|
| 1,001,433 | Olson | Aug. 22, 1911 |
| 1,351,846 | Forster | Sept. 7, 1920 |
| 1,359,155 | Davis | Nov. 16, 1920 |
| 2,170,305 | Ingwersen | Aug. 22, 1939 |
| 2,296,480 | Nicolai | Sept. 22, 1942 |
| 2,323,298 | Cook | July 16, 1943 |
| 2,432,703 | Walden | Dec. 16, 1947 |

FOREIGN PATENTS

| Number | Country | Date |
|---|---|---|
| 653,502 | Germany | Nov. 25, 1937 |